US012113728B2

(12) United States Patent
Shariati et al.

(10) Patent No.: US 12,113,728 B2
(45) Date of Patent: Oct. 8, 2024

(54) PILOT SIGNAL ASSIGNMENT

(71) Applicant: Telefonaktiebolaget LM Ericsson (publ), Stockholm (SE)

(72) Inventors: Nafiseh Shariati, Stockholm (SE); Hamed Farhadi, Stockholm (SE); Niklas Jaldén, Enköping (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 487 days.

(21) Appl. No.: 17/427,292

(22) PCT Filed: Feb. 4, 2019

(86) PCT No.: PCT/EP2019/052668
§ 371 (c)(1),
(2) Date: Jul. 30, 2021

(87) PCT Pub. No.: WO2020/160751
PCT Pub. Date: Aug. 13, 2020

(65) Prior Publication Data
US 2022/0150007 A1 May 12, 2022

(51) Int. Cl.
*H04L 5/00* (2006.01)
(52) U.S. Cl.
CPC .......... *H04L 5/0037* (2013.01); *H04L 5/0048* (2013.01); *H04L 5/0069* (2013.01)
(58) Field of Classification Search
None
See application file for complete search history.

(56) References Cited

U.S. PATENT DOCUMENTS

| | | | | |
|---|---|---|---|---|
| 10,819,402 B1* | 10/2020 | Marupaduga | ........ | H04B 7/0452 |
| 2006/0268406 A1* | 11/2006 | McMahon | .............. | G06F 16/29 |
| | | | | 359/485.01 |
| 2012/0135754 A1* | 5/2012 | Wu | ........................ | H04W 64/00 |
| | | | | 455/456.2 |
| 2015/0282234 A1* | 10/2015 | Sartori | .............. | H04W 28/0278 |
| | | | | 370/329 |
| 2017/0126309 A1* | 5/2017 | Rupasinghe | ......... | H04B 7/0617 |
| 2018/0006783 A1* | 1/2018 | Zhu | ........................ | H04L 5/0069 |

(Continued)

FOREIGN PATENT DOCUMENTS

EP 3258634 A1 12/2017

OTHER PUBLICATIONS

International Search Report and Written Opinion of the International Searching Authority, PCT/EP2019/052668, mailed Oct. 11, 2019, 12 pages.

(Continued)

*Primary Examiner* — Adnan Baig
(74) *Attorney, Agent, or Firm* — Weisberg I.P. Law, P.A.

(57) ABSTRACT

The disclosure provides methods, a base station and network nodes relating to the assignment of pilot signals to wireless devices. One aspect provides a method including obtaining grouping information grouping one or more of the plurality of wireless devices together based at least in part on clustering information corresponding to each of the plurality of wireless devices and according to one or more clustering criterion, assigning at least one pilot signal to the one or more wireless devices based on the grouping information and transmitting the at least one pilot signal.

18 Claims, 13 Drawing Sheets

(56) References Cited

U.S. PATENT DOCUMENTS

2018/0076937 A1* 3/2018 Nasiri Khormuji .. H04L 5/0073
2018/0309553 A1* 10/2018 Cao ..................... H04L 5/0048

OTHER PUBLICATIONS

Yin, H., et al., "A Coordinated Approach to Channel Estimation in Large-Scale Multiple-Antenna Systems," IEEE Journal on Selected Areas in Communications, vol. 31, No. 2, Feb. 2013, pp. 264-273.
Saxena, V., "Pilot Contamination and Mitigation Techniques in Massive MIMO Systems," Department of Electrical and Information Technology, LTH, Sweden, Oct. 24, 2014, 71 pages.
Björnson, E., et al., "Pilot Contamination is Not a Fundamental Asymptotic Limitation in Massive MIMO," IEEE ICC 2017 Wireless Communications Symposium, 6 pages.

* cited by examiner

PILOT SIGNAL ASSIGNMENT

CROSS REFERENCE TO RELATED APPLICATIONS

This application is a 35 U.S.C. § 371 national stage application of PCT International Application No. PCT/EP2019/052668 filed on Feb. 4, 2019, the disclosure and content of which is incorporated by reference herein in its entirety.

TECHNICAL FIELD

Embodiments herein relate generally to a base station and a method in the base station, and to a network node and a method in the network node. More particularly the embodiments herein relate to pilot signal assignment.

BACKGROUND

In wireless cellular networks, reference signals or reference symbols, also termed pilots or pilot signals/symbols are known signals or symbols which are transmitted at one side of a radio link to acquire channel state information (CSI) at the other end of the radio link. In $3^{rd}$ Generation Partnership Project (3GPP) long term evolution (LTE), for example, in the forward link, a base station (BS) periodically transmits cell-specific reference signals (CRS) that are used by terminals for initial acquisition, CQI measurement and channel estimation for coherent detection. These CQI values may be reported to the BS over a control channel which uses it for closed-loop power control, rate adaptation and scheduling. The terminals may transmit reference signals as well, for coherent demodulation of the reverse link at the BS.

In multi-user multiple input multiple output (MU-MIMO) beamformed/layered transmissions, the BS requires fairly accurate channel estimates for coherent processing of the forward and reverse links. In order to avoid interference from non-intended transmitters during the channel estimation phase, orthogonal pilots are used. The number of orthogonal pilot signals are limited by the amount of resources allocated for channel training and also with that of physical properties of the channel (e.g. coherence BW, coherence time).

In the existing technologies such as LTE, pilot sequences, which comprise the individual pilot signals, are generated by using a base sequence which is determined per cell. Within a cell, pilot signals may be generated from the cell-specific base sequence by exploiting other means to provide orthogonality i.e. cyclic shift or frequency comb pattern. However as mentioned before the number of possible orthogonal pilots is limited.

The emerging wireless networks are becoming denser, e.g. more wireless devices being served per cell, and the number of wireless terminals can exceed the number of possible orthogonal pilots. As a result many wireless terminals both in the same cell and in the neighboring cells may share the same pilots. This issue is referred to as 'pilot contamination'. Pilot contamination results in, for example, contamination of the channel estimate provided by the wireless devices re-using the same pilots across cells.

There is typically no coordination among different cells when it comes to pilot allocation or assignment, in other words pilot inter-cell interference, e.g. pilot contamination, is not avoided. Such problem leads to severe interference resulting in degradation of channel estimation accuracy and also the overall system performance.

A coordinated approach for pilot assignment has been discussed by H. YIN, D. GESBERT, M. FILIPPOU, and Y. LIU, "A coordinated approach to channel estimation in large-scale multiple-antenna systems," IEEE J. SEL. AREAS COMMUN., VOL. 31, NO. 2, PP. 264-273, February 2013.

In Vidit Saxena's, 'Pilot Contamination and Mitigation Techniques in Massive MIMO Systems,' Master Thesis, 2014, the goal is to minimize channel estimation error. This solution exploits desired and interfering channels' covariance matrices to identify the best possible pilot assignment through a greedy search. Obtaining estimated covariance matrices is essential for this solution since the closed form metric i.e. mean squared error of channel estimate, is a function of such covariance matrices. Moreover, the greedy search over all possible assignments in a serial manner is quite time consuming. Thus there is a desire for improved solutions to address the pilot contamination issue.

SUMMARY

In one or more embodiments described herein, a pilot signal assignment scheme takes a user equipment (UE) spatial signature into account. In one or more of the proposals, UEs are clustered based on their spatial signature and distinct orthogonal or semi-orthogonal pilot signals are assigned to UEs that are spatially similar. The set of distinct orthogonal pilots can be reused for UEs that are spatially different/separable.

Advantages provided by at least one of the embodiments described herein are that the overall pilot contamination in the network is minimized. This results in improved quality of processing the pilot signals, in other words, improved channel estimation, and hence improved overall network performance, e.g. throughput, coverage, reliability, communication delay. Additionally, by clustering/grouping UEs by considering their spatial signatures a higher number of UEs can sound the channel at the same time with reduced interference.

A further advantage may be obtained through exploiting machine learning algorithms, more specifically clustering, as a key enabler to identify a desired pattern (i.e. UEs separability) in the network, based on a given set of input criteria (e.g. prior knowledge on UEs spatial signature) can be used to achieve a certain goal e.g. more efficient pilot assignment or improved network performance.

In a first aspect, a method is performed by a base station serving a plurality of wireless devices. The method comprises obtaining grouping information grouping one or more of the plurality of wireless devices together based at least in part on clustering information corresponding to each of the plurality of wireless devices and according to one or more clustering criterion; assigning at least one pilot signal to the one or more wireless devices based on the grouping information; and transmitting the at least one pilot signals. In some examples of this aspect the at least one pilot signal is orthogonal or semi-orthogonal within a group of wireless devices. In some examples of this aspect the clustering information and the one or more clustering criterion is based at least in part on a measured property of the one or more of the plurality of wireless devices. In some examples of this aspect the grouping comprises each of the one or more wireless devices being within a group sharing common clustering information and wherein each one of the one of more wireless devices in said group are assigned a different, orthogonal/semi-orthogonal pilot signal of a plurality of pilot signals. In some examples of this aspect the obtained grouping information comprises a plurality of groups and the assigning at least one pilot signal to the one or more wireless devices comprises assigning a first pilot signal to a first wireless device in a first group and not assigning the first pilot signal to any other wireless device in the first group; and assigning said first pilot signal to a second wireless device only in a second group and not assigning the first pilot signal to any other wireless device in the second group. In other examples of this aspect the obtained grouping information comprises each one of the wireless devices in a group being distinct from each other according to the corresponding clustering information and the one or more clustering criterion and wherein at least two of the one of more wireless devices in said group are assigned the same pilot signal. In some further examples of this other example, each one of the one or more wireless devices in said group are assigned the same pilot signal. In some further examples the obtained grouping information comprises a plurality of groups according to the one or more clustering criterion and the assigning a pilot signal to the one or more wireless devices comprises assigning a different pilot signal to each one of the different groups. In some examples the one or more clustering criterion comprises a spatial relationship between each of the one or more wireless devices and the base station. In a further example, the spatial relationship comprises a relative direction between each of the one or more wireless devices and the base station. In some examples the obtaining grouping information comprises sending a request for grouping information, and receiving the grouping information in response to the request. In a further example the request comprises indicating the one or more clustering criterion.

In another aspect, a method performed by a network node is provided. The method comprising obtaining clustering information corresponding to one or more wireless devices; grouping the one or more wireless devices into one or more groups based on the clustering information and according to one or more clustering criterion; and providing grouping information to a second network node wherein the grouping information corresponds to the grouping of the one or more wireless devices. In some examples the method further comprises receiving a request for grouping the one or more wireless devices; and wherein the providing is in response to the request. In some examples the request comprises the one or more clustering criterion and/or the clustering information. In some examples the one or more clustering criterion comprises a spatial relationship between each of the one or more wireless devices and a base station. In some examples the spatial relationship is a relative direction between each of the one or more wireless devices and the base station. In some examples the clustering information comprises a spatial signature. In some examples the clustering information comprises any of angle of arrival positioning information; global positioning information; assisted global positioning information; serving cell information; and beam-reports in a beam-managed system. In some examples grouping the one or more wireless devices into one or more groups based on one or more clustering criterion comprises each of the one or more wireless devices being within a group sharing a common clustering criterion. In some further examples grouping the one or more wireless devices into one or more groups based on one or more clustering criterion comprises the spatial information of each one of the wireless devices in the group being distinct from each other according to the one or more clustering criterion. In some examples the method further comprises obtaining further clustering information; and adapting the grouping of the one or more wireless devices based on the further clustering information. In some examples the obtaining further clustering information comprises requesting periodical updates of previously reported clustering information. In some examples the further clustering information comprises a delta from a previously reported clustering information. In some examples adapting the grouping of the one of more wireless devices comprises removing one or more wireless devices from a first group and adding the one or more wireless devices to a second group. In some examples the network node comprises a server. In some examples obtaining clustering information comprises obtaining the information from a remote database. In some examples the method further comprises assigning pilot signals to the one or more wireless devices based on the grouping and wherein the grouping information comprises the pilot signal allocation/assignment.

In another aspect a base station is configured for serving a plurality of wireless devices and the base station is configured to obtain grouping information grouping one or more of the plurality of wireless devices together based at least in part on clustering information corresponding to each of the plurality of wireless devices and according to one or more clustering criterion. The base station is also configured to assign a pilot signal to the one or more wireless devices based on the grouping information and transmit the one or more pilot signals. In some examples the grouping comprises each of the one or more wireless devices being within a group sharing common clustering information and wherein each one of the one of more wireless devices in said group are assigned a different, orthogonal or semi-orthogonal pilot signal of a plurality of pilot signals. In some examples the obtained grouping information comprises the spatial information of each one of the wireless devices in a group being distinct from each other according to the one or more clustering criterion and wherein at least two of the one of more wireless devices in said group are assigned the same pilot signal. In some examples each one of the one or more wireless devices in said group are assigned the same pilot signal. In some examples the obtained grouping information comprises a plurality of groups according to the one or more clustering criterion and the base station is configured to assign a different pilot signal to each one of the different groups. In some examples the base station is further configured to send a request for grouping information and wherein the obtained grouping information is obtained in response to said request.

In another aspect a network node configured to obtain clustering information corresponding to one or more wireless devices, group the one or more wireless devices into one or more groups based on the clustering information and according to the one or more clustering criterion, and provide grouping information to a second network node, wherein the grouping information corresponds to the grouping of the one or more wireless devices. In some examples the network node is further configured to receive a request for grouping the one or more wireless devices, wherein the provided grouping information is provided in response to the request. In some examples the one or more clustering criterion comprises a spatial relationship between each of the one or more wireless devices and a base station. In some examples the clustering information comprises any of angle of arrival positioning information, global positioning information, assisted global positioning information, serving cell information; and beam-reports in a beam-managed system. In some examples grouping the one or more wireless devices into one or more groups based on one or more clustering criterion comprises each of the one or more wireless devices being within a group sharing a common clustering criterion. In some examples grouping the one or more wireless devices into one or more groups based on one or more clustering criterion comprises the spatial information of each one of the wireless devices in a group being distinct from each other according to the one or more clustering criterion. In some examples the network node is further configured to obtain further clustering information; and adapt the grouping of the one or more wireless devices based on the further clustering information. In some examples the obtained further clustering information comprises requesting periodical updates of previously reported clustering information. In some examples the further clustering information comprises a delta from a previously reported clustering information. In some examples the adapted grouping of the one of more wireless devices comprises removing one or more wireless devices from a first group and adding the one or more wireless devices to a second group. In some examples the network node comprises a server. In some examples the network node is configured to obtain the clustering information from a remote database. In some examples the network node is further configured to assign pilot signals to the one or more wireless devices based on the grouping and wherein the grouping information comprises the pilot signal assignment/allocation.

In another aspect a computer program is provided which comprises instructions which when executed by processing circuitry cause the processing circuitry to execute any one of the examples of the method performed by a base station, described above.

In another aspect a computer program is provided which comprises instructions which when executed by processing circuitry of a computer cause the processing circuitry to execute any one of the examples of the method performed by a network node, described above.

In another aspect a computer program product in the form of a device readable medium or memory or carrier is provided. The computer program product comprising instructions which when executed on by processing circuitry of a computer cause the processing circuitry to execute any one of claims examples of the method performed by a base station or any one of the examples of the method performed by a network node, as described above.

DETAILED DESCRIPTION

Figure 1:
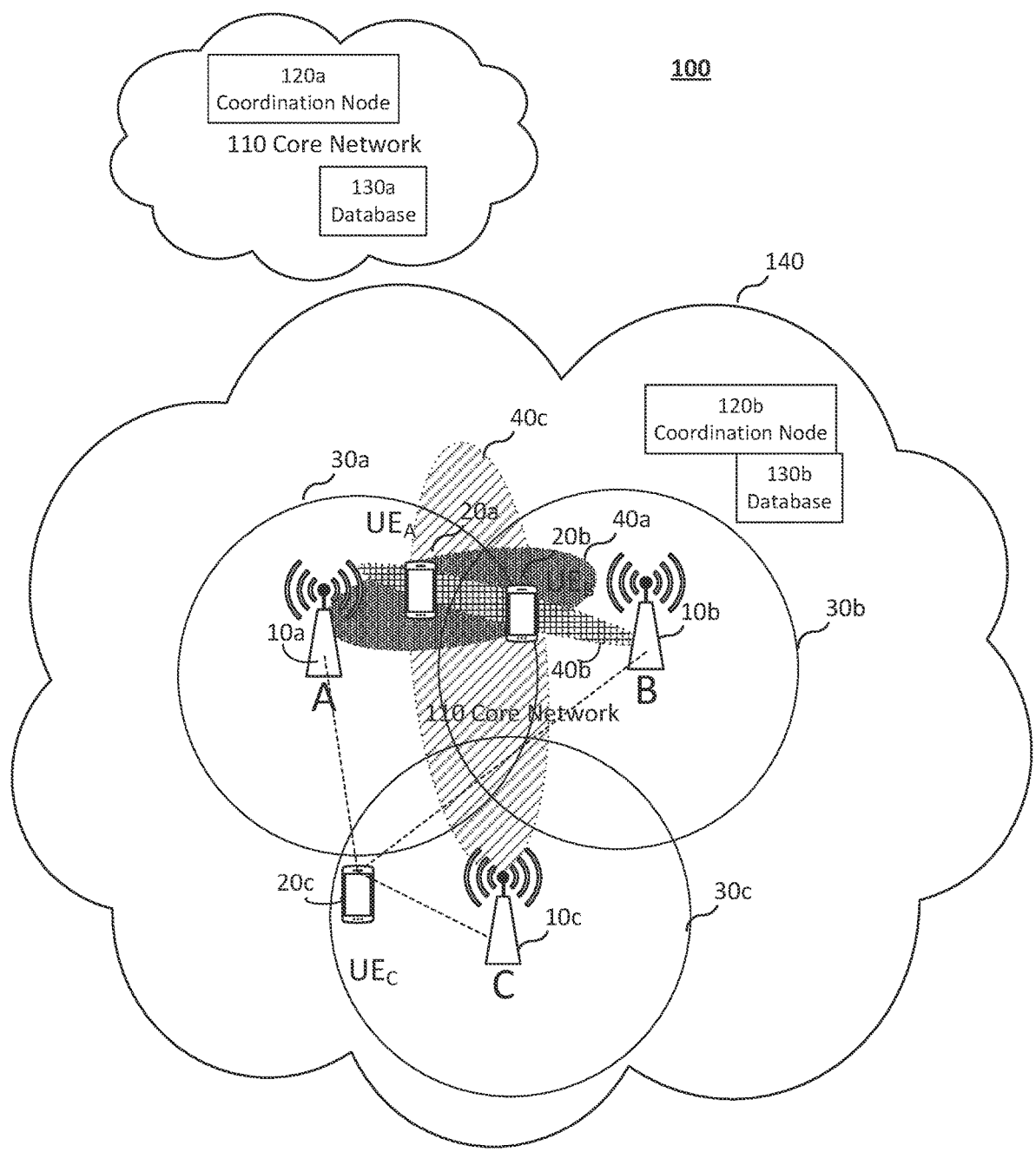
FIG. 1 is an example network environment according to embodiments of the present disclosure.

An issue addressed by at least one of the embodiments herein is how to improve the pilot signal allocation to mitigate pilot signal contamination without requiring channel covariance estimation matrices. In one or more of the embodiments disclosed herein wireless devices or user equipment (UE) are grouped together, i.e. clustered, based on clustering information, for example their spatial information, to enable reuse of pilot signal sequences while controlling interference level in the network. Some examples of spatial information that can be used are relative locations, angle of arrivals (AOAs), a spatial database including, for example, Rx-power signatures (as may be used in WIFI for positioning), etc. Herein, we consider AOA as an example metric for clustering to explain the proposed solution.

A pilot signal, as used herein, refers generally to pilot sequences used for reference signal sequences. Pilot signals may refer to reference signal sequences sent from a radio access node, e.g. base station in down link (DL) such as cell-specific reference signals (CRS)/Beam Reference Signals or channel state information reference signals (CSI-RS) or may refer to uplink (UL) pilots or reference signals sent from a wireless device to a radio access node. The pilot signals may be used for channel estimation, channel state acquisition, cell search/synchronisation, cell shaping and/or localization.

Pilot signals may be orthogonal, or semi-orthogonal, by virtue of their individual symbol sequence or transmission resource allocation within a set of time-frequency resources. For example, a certain type of pilot signal may comprise a number of symbol sequences derived from a common base sequence, the individual (orthogonal) pilot sequences being derived for example by cyclic shifts of the base sequence.

Further orthogonal pilot signals may be obtained by time and/or frequency shifts to the resource elements in which the pilot signal is assigned. A combination of multiple methods may be employed to obtain a set of orthogonal or semi-orthogonal pilot sequences.

The inner product of an orthogonal pilot signal, when represented by vectors 'X' and 'y' is equal to zero, i.e. x.*y^{H}=0 where '.*' represents inner product operation, and y^{H} is the Hermitian of vector y. The inner product of semi-orthogonal pilot signal, when represented by vectors 'X' and 'y' is equal to epsilon, i.e. x.*y^{H}=epsilon, where epsilon is a small value close to zero.

As used herein, radio access node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. In particular, a radio access node may be comprised in a non-terrestrial network as part of a wireless communications system. A non-terrestrial network (NTN) comprises communications satellites and radio access nodes. The radio access nodes may be terrestrial or satellite based. For example, the radio access node may be a satellite gateway or a satellite based base station. Other examples of radio access nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A radio access node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a radio access node may be a virtual network node as described in more detail below. More generally, however, radio access nodes may represent any suitable device (or group of devices) capable, configured, arranged, and/or operable to enable and/or provide a wireless device with access to the wireless network or to provide some service to a wireless device that has accessed the wireless network.

As used herein, wireless device refers to a device capable, configured, arranged and/or operable to communicate wirelessly with radio access nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In particular the wireless device may be involved in communication with a non-terrestrial radio access nodes, such as communications satellites and satellite based gateways or base stations. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a radio access node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As used herein network node refers to a physical node or logical entity within the network, also often referred to as the core network. Examples of core network nodes are MSCs, MMEs, O&M nodes, OSS nodes, SON nodes, positioning nodes (e.g., E-SMLCs), and/or MDTs. The network node may comprise a central coordination entity, which may also be termed coordination node according to certain embodiments. In some examples the network node may be a specialised function, e.g. software defined node, and may be named a clustering node.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments are generally described in consideration to downlink (DL) pilot signals, i.e. in the direction from a base station to one or more wireless devices in a cell, providing an advantage in improved channel estimation or channel state information provided by the one or more wireless devices to said base station. However, the principles described may also be applied to the allocation or assignment of uplink pilots signals for transmission by wireless devices, for example sounding reference signals.

FIG. 1 depicts a communications network 100 in which embodiments of the present disclosure may be applied. Communications network 100 comprises a radio network 140 comprising three cells A, B and C, referred to generally as 30 (denoted a, b and c, respectively) each with a radio access node, e.g. a base station (BS) 10 (likewise denoted a, b and c, respectively). Each cell 30 serves a plurality of UEs, e.g. UE 20 (likewise denoted a, b and c, respectively). Communications network 100 also comprises a core network 110 which may comprise other nodes such as a coordination node 120a, databases 130a as well as other nodes or entities (not shown) such as positioning servers which may be relevant to some of the embodiments disclosed herein. In some examples the radio network 140 may comprise a coordination node 120b and/or databases 130b. These entities may be in addition, or instead of those comprised in the core network 110.

A spatial signature of a UE is a term given to one or more location type properties which characterise a UE's position in a radio network. Such location type properties are termed herein spatial information. One example of a property which may be used to define a UE's spatial signature is Angle of arrivals (AOA). AOAs of each beam 40 (likewise denoted a, b and c, respectively) may be obtained for each UE-BS pair as means to derive the spatial signature for each UE. For example, the AOAs for each UE-BS pair may be stored in a database wherein the data may be as shown in Table 1, below. In the table, the rows corresponding to $UE_A$ and $UE_B$, comprising AOAs between these UEs and each BSs, will be quite similar in contrary to that of $UE_C$.

TABLE 1

|  | $BS_A$ | $BS_B$ | $BS_C$ |
| --- | --- | --- | --- |
| $UE_A$ | $AOA_{AA}$ | $AOA_{AB}$ | $AOA_{AC}$ |
| $UE_B$ | $AOA_{BA}$ | $AOA_{BB}$ | $AOA_{BC}$ |
| $UE_C$ | $AOA_{CA}$ | $AOA_{CB}$ | $AOA_{CC}$ |

Assuming N orthogonal pilots and K users (K>N) where the pilots are assigned randomly, there is a chance that $UE_A$ and $UE_B$ share the same pilot. This would result in inter-cell interference for pilot transmission, hence degrading channel estimation quality and correspondingly the system performance.

In one example, a central coordination entity or node collects spatial information, for example AOAs of all UE-BS pairs in the network at a given state and stores them in a database. One way to acquire the spatial information (e.g. AOAs) is to introduce a training phase during which all UEs in the network in an orthogonal fashion send signals to BSs. Each BS estimates the AOAs of current UEs and communicate this, e.g. via a backhaul link, to the database or other network node (e.g. clustering node). The training phase can be implemented to occur periodically to capture the updated spatial signature of UEs in the network. For example, if there are moving UEs in the network such dynamic information will be tracked by having a periodic training phase. This spatial information can also be collected for instance based on the UE/BS locations (e.g. using global positioning system, GPS, information). In a further example, a clustering unit groups UEs based on their spatial separability such that even if the same pilot is reused interference level does not increase significantly in the network following a criterion, e.g. a key performance indicator, KPI1. In other words, the proposed scheme tries to reduce the overlapped space between signal space and interference space. Next, pilots are assigned to UEs in each cluster. In some examples, another performance criterion, e.g. KPI2 can be tested out to see if any improvement in regard of the assumed performance metric is achieved. Examples of such performance metrics are overall channel estimation error or interference level in the network. In some examples, KPI2 can be equal to KPI1. If KPI2 is improved, clusters and UEs' pilots are kept, i.e. the allocation/assignment of pilots to UEs is unchanged, until the database is updated. An update of the database can happen either when clustering information, e.g. the spatial information, is updated after a new training phase, or if may be triggered by changes to capture updates in the environment (e.g. UE mobility, channel variations).

Figure 2:
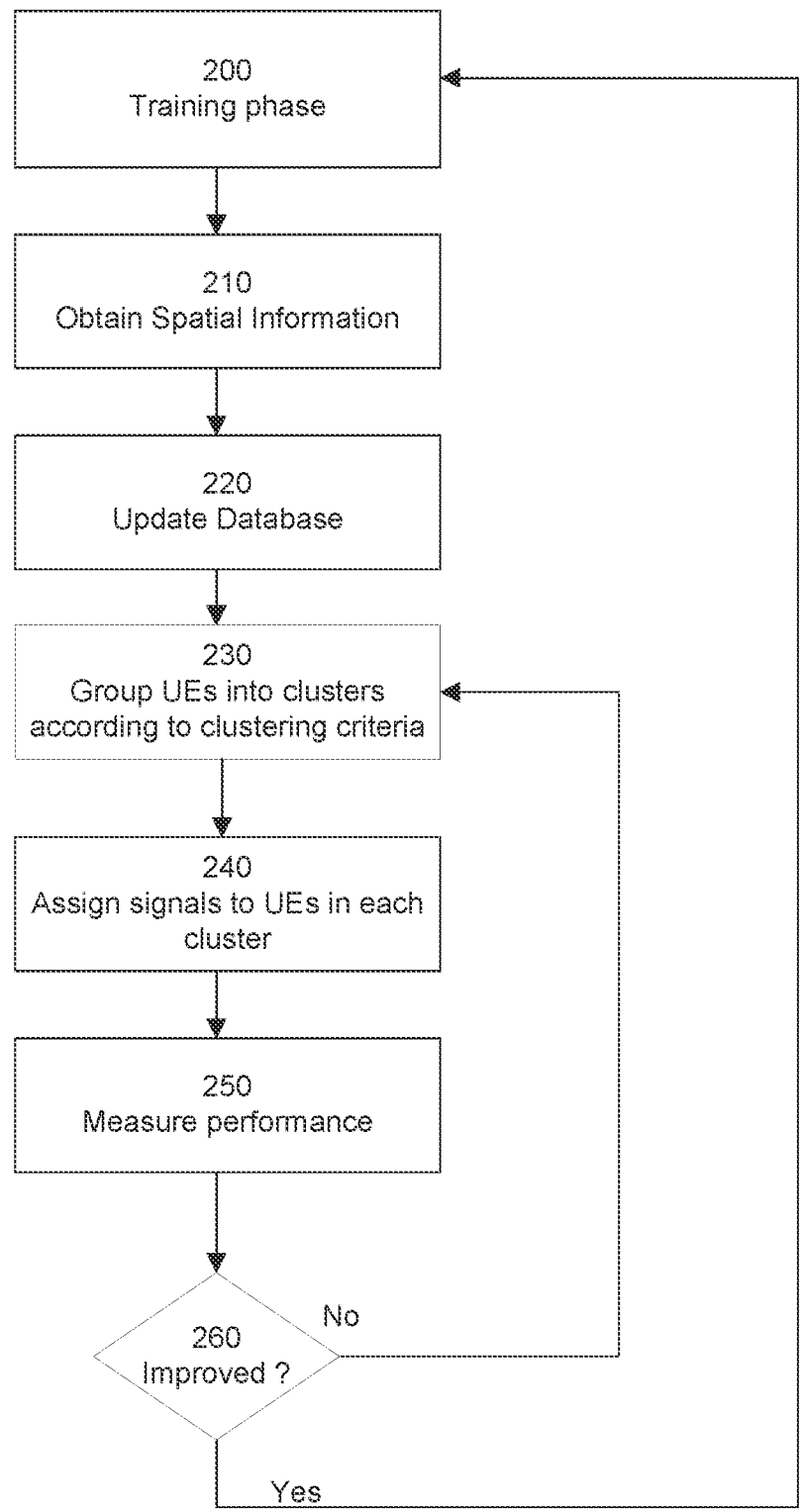
FIG. 2 is a flow diagram illustrating an exemplary sequence according to embodiments of the present disclosure.

FIG. 2 illustrates an example of the actions an exemplary system performs according to the above described embodiments. At 200 a training phase occurs which may occur on demand/triggered by an external input. In some examples the training phase may be periodic, in other examples it may be scheduled with varying intervals. The training phase may be preconfigured or periodically requested by another node in the network. At 210 the spatial information is obtained, for example AOAs are estimated/collected. This provides a periodical update of the spatial information of the UEs with respect to the base stations in serving and neighbouring cells. The collected or updated spatial information may be provided to a database at 220 to be later fetched by a base station or other coordination node to perform the clustering. When spatial information is obtained in some examples only the change is reported to the database. In other examples the spatial information as obtained is reported to the database.

The clustering process 230 groups all registered/attached UEs into clusters according to one or more clustering criterion. A clustering criterion is a rule or requirement upon which the clustering/grouping decision is based. Various clustering criteria may be considered. Two specific criteria are described in further detail below. In some examples the grouping of UEs into clusters is performed by each base station, wherein each base station may obtain the clustering information, e.g. spatial information, from the database or may retain the spatial information/clustering information internally. In other examples a coordination node/clustering entity performs the grouping and provides grouping information to each base station. In some examples, the grouping information is provided in response to a request from a base station. In other examples, the clustering entity provides each base station with updated grouping information. In any one of the above example embodiments the one or more clustering criterion may be predefined or may be signalled. The one or more clustering criterion may change over time depending on a number of factors, further examples are given below. Grouping information indicates which UEs are in which group, but it may also include one or more clustering criterion and/or clustering information used to performed the grouping, depending on whether the base station provided the clustering criterion or it just received the grouping and then needs to know which criterion was applied so that it can assign pilots based on this grouping information.

At 240 pilot signals are assigned to UEs in each cluster, depending on the clustering criterion and thus the specific grouping of UEs will give a different distribution of the available pilot signals. As described above, an ideal system will continuously monitor the performance of the network against key performance indicators based on measurements performed 250.

Therefore, in some embodiments the optional action 260 is implemented, wherein the performance is compared with KPIs to determine if the performance (e.g. measured SINR, quality of channel estimation) is improved as a result of the latest allocation or assignment of the pilot signals. If the performance against the aforementioned KPIs is not improved or in some examples if it is degraded, then the clustering 230 is performed again with different criteria and/or the assignment of UEs in each cluster 240 is performed. In other words, the clustering may be performed again where this time clustering is performed differently from before either using different criterion or applying a different clustering algorithm with the same clustering criterion or both.

Figure 3:
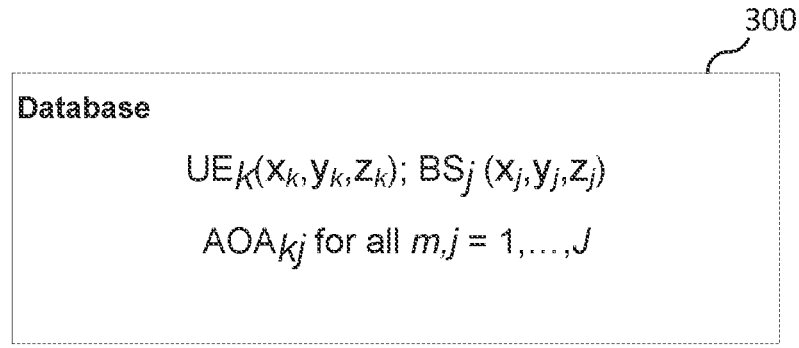
FIG. 3 is a block diagram illustrating an exemplary repository according to embodiments of the present disclosure.

FIG. 3 depicts an example of database 300 with entries comprising location information for each UE and base station. For example $UE_k$ has location $x_k, y_k, z_k$ and $BS_j$ has location $x_j, y_j, z_j$ and angle of arrival information is stored for all values m of j from 1 to J with respect to $UE_k$.

Figure 4:
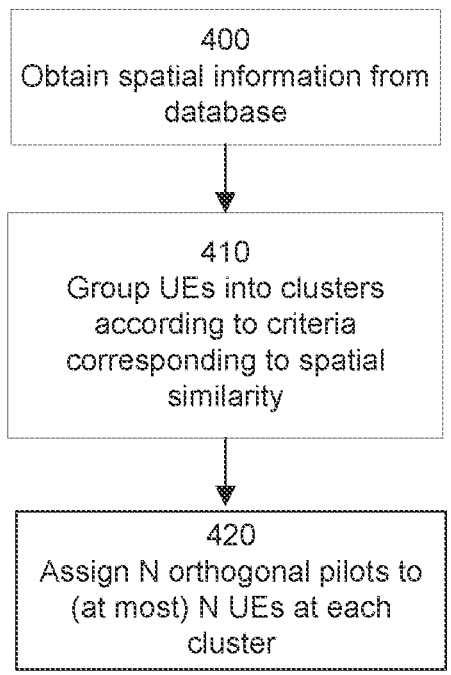
FIG. 4 is a flow diagram illustrating an exemplary sequence according to embodiments of the present disclosure.
Figure 5:
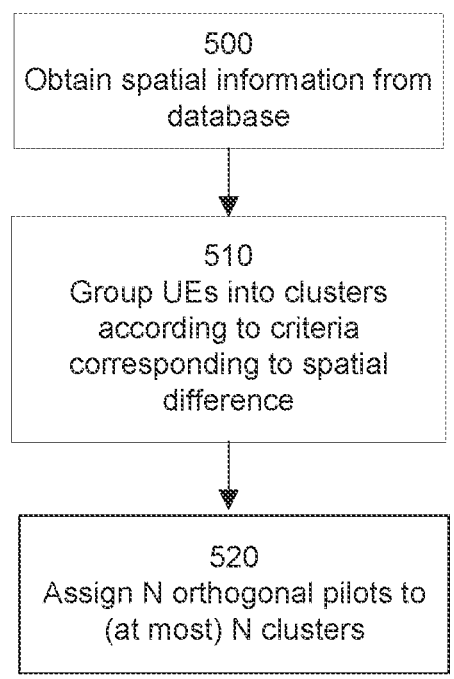
FIG. 5 is a flow diagram illustrating an exemplary sequence according to embodiments of the present disclosure.

We explain two examples for grouping the UEs into clusters in further detail as depicted by FIGS. 4 and 5 respectively wherein a step 400, 500 to obtain the spatial information from the database may be the same for either implementation.

In FIG. 4, at 410 spatially different clusters are formed or grouped by including UEs with similar spatial signature. Therefore, within each cluster orthogonal pilots are used for UEs. In some examples the pilot signals are assigned to the UEs 420. If there are more UEs than N orthogonal pilots, either a semi-orthogonal pilot or one of the N pilots are used/reused for the $(N+1)^{th}$ UE. In other clusters however, the same set of N orthogonal pilots may be used where orthogonality/semi-orthogonality is achieved using either spatial separability or other means such as time and/or frequency shifts. The blocks given in FIG. 4 may be implemented within a single radio access node such as a base station or the blocks may be distributed with each block implemented by separate nodes or elements or two blocks may be implemented by the same node, for example a central coordination entity may implement the steps 400 and 410 and provide the grouping to a base station to implement step 420.

In FIG. 5, at 510 clusters are formed or grouped such that they include spatially different UEs. As a result, similar pilot signals can be reused for UEs within each cluster where orthogonality/semi-orthogonality is achieved using spatial separability. For each cluster, one of the N orthogonal pilots is considered as the base pilot that is used for all spatially separable UEs within a given cluster. If more than N clusters are defined, either a semi-orthogonal pilot or one of the N pilots are used/reused for the $(N+1)^{th}$ cluster. The blocks given in FIG. 5 may be implemented within a single network node such as a base station or the blocks may be distributed with each block implemented by separate network nodes or elements or two blocks may be implemented by the same node, for example a central coordination entity may implement the steps 500 and 510 and provide the grouping to a base station to implement step 520.

The solution is based on clustering UEs by taking their spatial signature relative to base stations into account. Such clustering provides knowledge about spatial orthogonality that as a result can be used for pilot signal assignment to minimize inter-user interference in data/pilot transmission phase.

Figure 6:
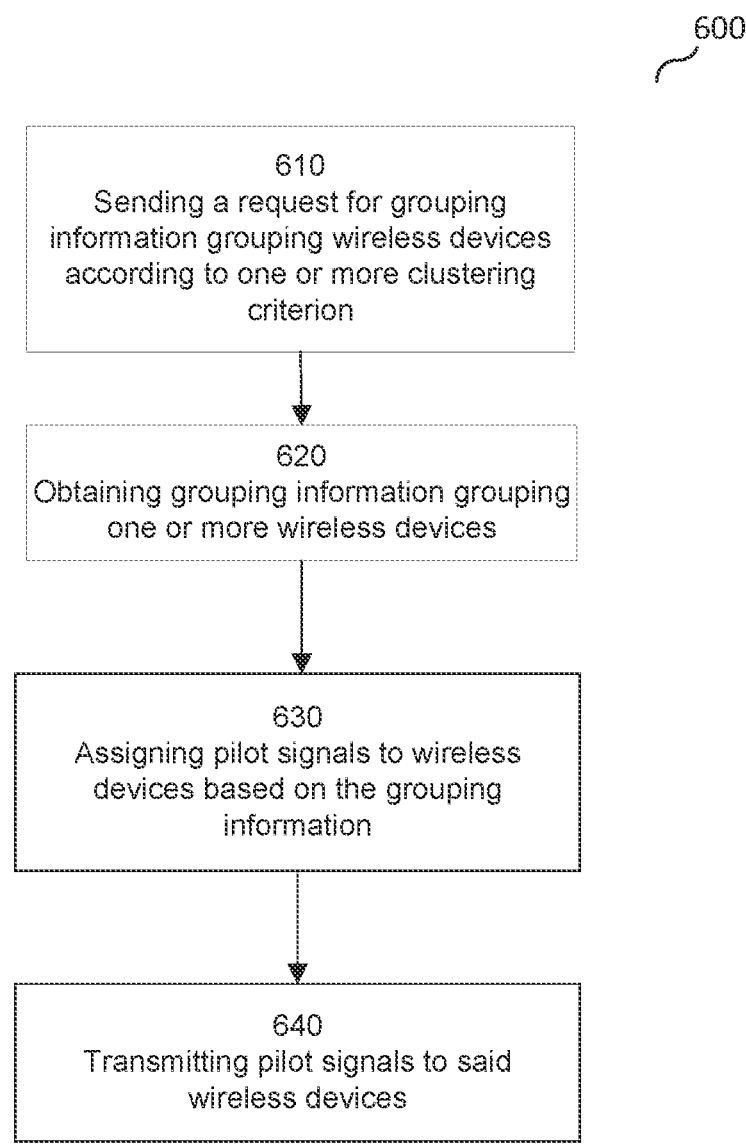
FIG. 6 is a flow diagram illustrating an exemplary method implemented by a radio access node according embodiments of the present disclosure.

FIG. 6 depicts a method 600 performed by a radio access node such as a base station. The base station may be serving a plurality of wireless devices, for example the wireless devices are camped on or attached to the cell provided by the base station.

Optionally, the method 600 comprises sending a request 610 for grouping information which identifies the wireless devices of the groups. The wireless devices are grouped according to a clustering criterion.

The method 600 comprises obtaining 620 grouping information which groups one or more of the plurality of wireless devices together based at least in part on clustering information corresponding to each of the plurality of wireless devices and according to one or more clustering criterion as described above. In some examples the grouping information comprises identifying each wireless device to a group or cluster. Grouping information may also comprise a clustering criterion and/or spatial information or other clustering information used to determine the grouping. For example, when a group of wireless devices are clustered for spatial similarity (e.g. the wireless device positions have a separation which is less than a threshold separation), the grouping information may indicate this and in some further examples may include the range within which each wireless device's AOA lies. The obtaining step may comprise the base station determining the grouping itself or in other examples the base station may receive the grouping information from another network node or entity. In such examples the grouping information may be received periodically, for example after periodically trigger training phases, as described above. When the grouping is performed by the base station, the base station may obtain clustering information, e.g. spatial information, from an external database or may have its own internal database of the spatial information.

The method 600 includes for example assigning 630 a pilot signal to the one or more wireless devices based on the grouping information. Pilot signal allocation may be performed by assigning pilot signals to radio resources associated with the one or more wireless devices. This method is mentioned here as a generic means of transmission (a radio resource element as an entity to carry pilot symbols). Of course, spatial beamforming provided by MIMO technology and encoding can be added to achieve e.g. better spatial separability, better orthogonality, enhanced coverage, etc.

The method 600 also includes transmitting 640 the one or more pilot signals to the one of more wireless devices, for example on said radio resources. The pilot signals may be transmitted in a broadcast or broad beam signalling. In other examples the pilot signals may be beamformed to a narrow beam. In some examples the choice of beam forming may depend on the one or more clustering criterion. The pilot signals may be orthogonal or semi-orthogonal. In some examples the one or more clustering criterion is based at least in part on a measured property of the one or more of the plurality of wireless devices. In some examples the grouping comprises each of the one or more wireless devices being within a group sharing common clustering information and wherein each one of the one of more wireless devices in said group being assigned a different, orthogonal/semi-orthogonal pilot signal of a plurality of pilot signals. In some examples the one or more clustering criterion includes a range within which "spatially similar" UEs would comply with said clustering criterion. For example the criterion may be a range of AOAs and provided the measured and reported AOAs are within that range then the respective wireless devices will be identified as being within the same group. In some examples, the clustering criterion is a position separation between UEs being lower (for spatial similarity) or higher (for spatial difference) than a threshold, based on the AoAs.

When the wireless devices are so grouped, each one of the one of more wireless devices in said group are assigned a different pilot signal of a plurality of pilot signals. A "different" pilot signal is one out of the available separate pilot signal sequences available to be assigned by the radio access node. The available number of separate pilot signal sequences depends on a number of factors such as, but not limited to, the type of pilot signal, number of resources available and/or the means deployed in the cell to generate orthogonal pilots, as previously described. In contrast, when a pilot signal is re-used, for example for UEs which are spatially separate, such pilots are referred to as being the "same" pilot signal. In some examples the obtained grouping information comprises a plurality of groups and the assigning 630 of a pilot signal to the one or more wireless devices comprises assigning a first pilot signal to a first wireless device and not assigning the first pilot signal to any other wireless device in the first group; and assigning said first pilot signal to a second wireless device only in a second group and not assigning the first pilot signal to any other wireless device in the second group.

In other examples the obtained grouping information comprises each one of the wireless devices in a group being distinct from each other according to the corresponding clustering information and the one or more clustering criterion and wherein at least two of the one of more wireless devices in said group are assigned the same pilot signal. In this scenario, distinct may correspond to the spatial information being different from the other wireless devices according to a certain criterion. Taking the abovementioned example for AOA, wireless devices which are distinct from each other may have a difference between each AOA of a certain value, e.g., a number of degrees. In some examples the one or more clustering criterion requires the spatial information of each wireless device to be distinct from each other, each one of the one or more wireless devices in said group are assigned the same pilot signal. In some further examples of this clustering criterion, the obtained grouping information comprises a plurality of groups according to the criterion and the assigning 630 a pilot signal to the one or more wireless devices comprises assigning a different pilot signal to each one of the different groups.

The one or more clustering criterion may comprise a spatial relationship between each of the one or more wireless devices and the base station. In some examples the spatial relationship is a relative direction between each of the one or more wireless devices and the base station, for example angle of arrival, AOA, information.

Optionally, the obtaining grouping information comprises sending a request for grouping information, and receiving the grouping information in response to the request. This may be further described in relation to method 600 including the base station sending 600 a request for grouping information to another node, for example a coordination node, which may be termed a clustering node. The obtaining grouping information 620 is thus obtained in response to said request. In some examples the request indicates the one or more clustering criterion. The clustering criterion may include information regarding the type of spatial information the base station wishes the clustering node to take into account when grouping the wireless devices into clusters.

The information may also indicate the type of clustering, e.g. spatially similar or spatially distinct/different. In other examples such clustering type may be implied/determined by the clustering node based on other clustering criteria such as cell load, other cell performance characteristics. In some examples the request may include further clustering information in such as serving cell information, beam-reports in a beam-managed system (e.g. CSI-RS reports for MSG1 and MSG3) which the clustering node should take into account, in addition to the spatial information when grouping the UEs into clusters.

As previously discussed, the grouping information may be updated as a result of a periodically triggered training phase. This training phase may be triggered by a new request from the base station for updated grouping information. In other examples the base station may perform measurements on the performance of the pilot signal allocations against certain KPIs (see above for more detailed discussion) and as a result may request updated grouping information with different clustering criteria.

Figure 7:
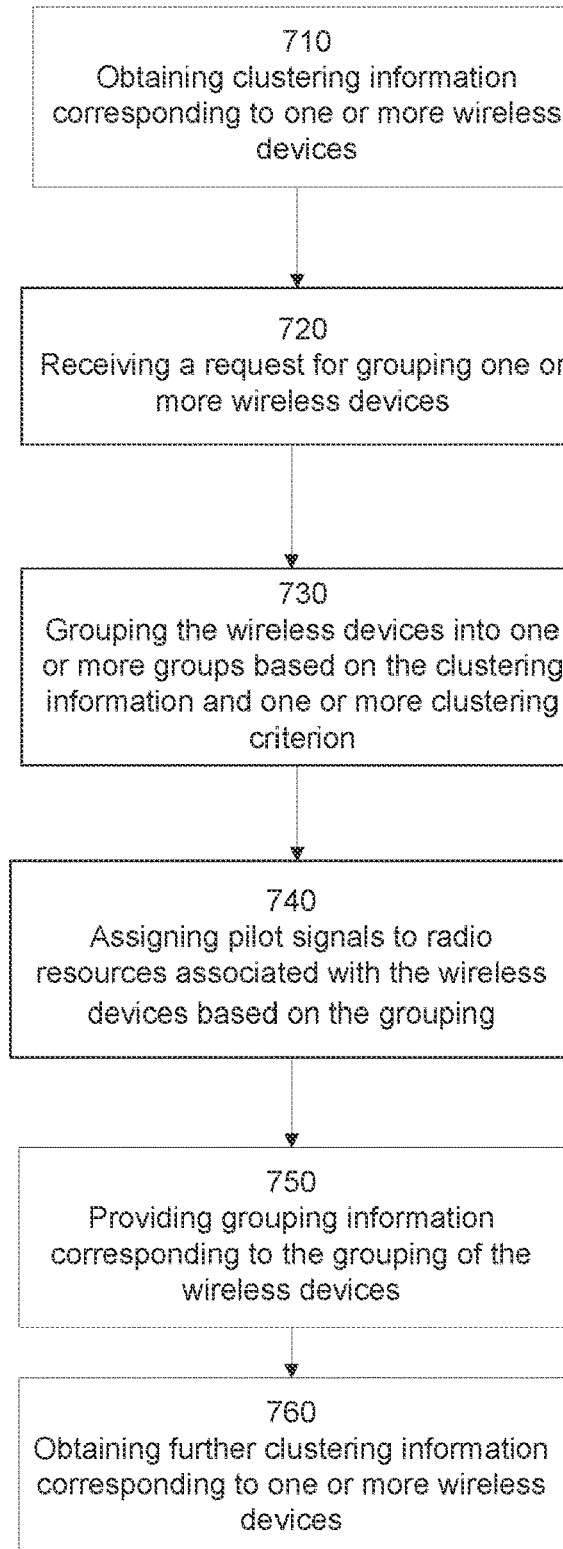
FIG. 7 is a flow diagram illustrating an exemplary method implemented by a network node according embodiments of the present disclosure.

FIG. 7 depicts a method 700 performed by a network node, for example a coordination node or clustering node. The network node may comprise a server, for example in a cloud type computing environment. The method 700 involves obtaining 710 clustering information corresponding to one or more wireless devices. The network node may obtain the clustering information by receiving, for example, spatial information and incorporating a database or repository from which it can determine the clustering information. In other examples obtaining 710 clustering information comprises obtaining the information from a remote database. The clustering information may comprise a spatial signature, for example. In some examples the clustering information comprises spatial information and other characteristics of the base station/cell which should be taken into account when performing the grouping of UEs into clusters. For example, any one or more of: an angle of arrival, positioning information, global positioning information, assisted global positioning information, serving cell information, beam-reports in a beam-managed system. The method 700 includes grouping 730 the one or more wireless devices into one or more groups based on the clustering information and according to one or more clustering criterion. The one or more clustering criterion may comprise a spatial relationship between each of the one or more wireless devices and a base station. In some examples the spatial relationship is a relative direction between each of the one or more wireless devices and the base station, for example angle of arrival, AOA, information. The clustering criterion may include a range within which spatially similar UEs should meet said criterion. The method also comprises providing 750 grouping information corresponding to the grouping of the one or more wireless devices. The grouping information is provided to a second network node. The second network node may be a base station. The network node may provide the grouping information to a plurality of second network nodes, for example all base stations in radio access network.

In some examples the method includes receiving 720 a request for grouping the one or more wireless devices and then the providing 740 the grouping information is provided in response to the request. In other examples the grouping information may be periodically performed and provided to a base station for example, thus the step 720 would not occur in some examples. However, in some examples a base station may explicitly request grouping information, for example as a result of performance measurements to determine that the latest pilot signal allocations have not produced an improvement to the performance or the performance has deteriorated. In some examples the request comprises the one or more clustering criterion and/or the clustering information. In some aspects, the grouping of the wireless devices 730 is not carried out in response to the request 720, and has already been determined. The request 720 initiates the providing 750 of the predetermined grouping information.

In some examples the grouping 730 of the one or more wireless devices into one or more groups based on one or more clustering criterion may comprise each of the one or more wireless devices being within a group sharing a common clustering criterion.

In other examples the grouping 730 of the one or more wireless devices into one or more groups based on one or more clustering criterion comprises each one of the wireless devices in a group being distinct from each other according to the one or more clustering criterion. In this scenario, distinct corresponds to the spatial information being different from the other wireless devices according to a certain criterion. Taking the abovementioned example for AOA, wireless devices which are distinct from each other may have a difference between each AOA of a certain value, e.g., a number of degrees. In some examples the clustering criterion requires the spatial information of each wireless device to be distinct from each other, each one of the one or more wireless devices in said group may then be assigned the same pilot signal. In some further examples of this clustering criterion, the grouping information provided at 750 comprises a plurality of groups according to the one or more clustering criterion and a pilot signal may be assigned to the one or more wireless devices by assigning a different pilot signal to each one of the different groups.

Optionally the method 700 may include obtaining 760 further clustering information, for example as a result of a periodical training phase. The obtaining 760 further clustering information may comprises requesting periodical updates of previously reported clustering information or alternatively this may involve being periodically updated without an explicit request. The further clustering information may in some examples comprise a delta from a previously reported clustering information. The obtaining 760 further clustering information optionally comprises adapting the grouping of the one or more wireless devices based on the further clustering information. In some examples adapting the grouping of the one of more wireless devices comprises removing one or more wireless devices from a first group and adding the one or more wireless devices to a second group.

Optionally the method 700 includes assigning 740 pilot signals to the one or more wireless devices based on the grouping. For example, the pilot signals may be assigned to radio resources associated with the one or more wireless devices. This may for example be a separate service request by a base station or may comprise the normal function of the network node to perform the pilot signal allocation/assignment for a plurality of base stations/cells. The grouping information provided in such examples comprises the pilot signal allocation/assignment. In such examples the adapting the grouping information would comprise performing a new assignment of pilot signals to wireless devices.

Figure 8:
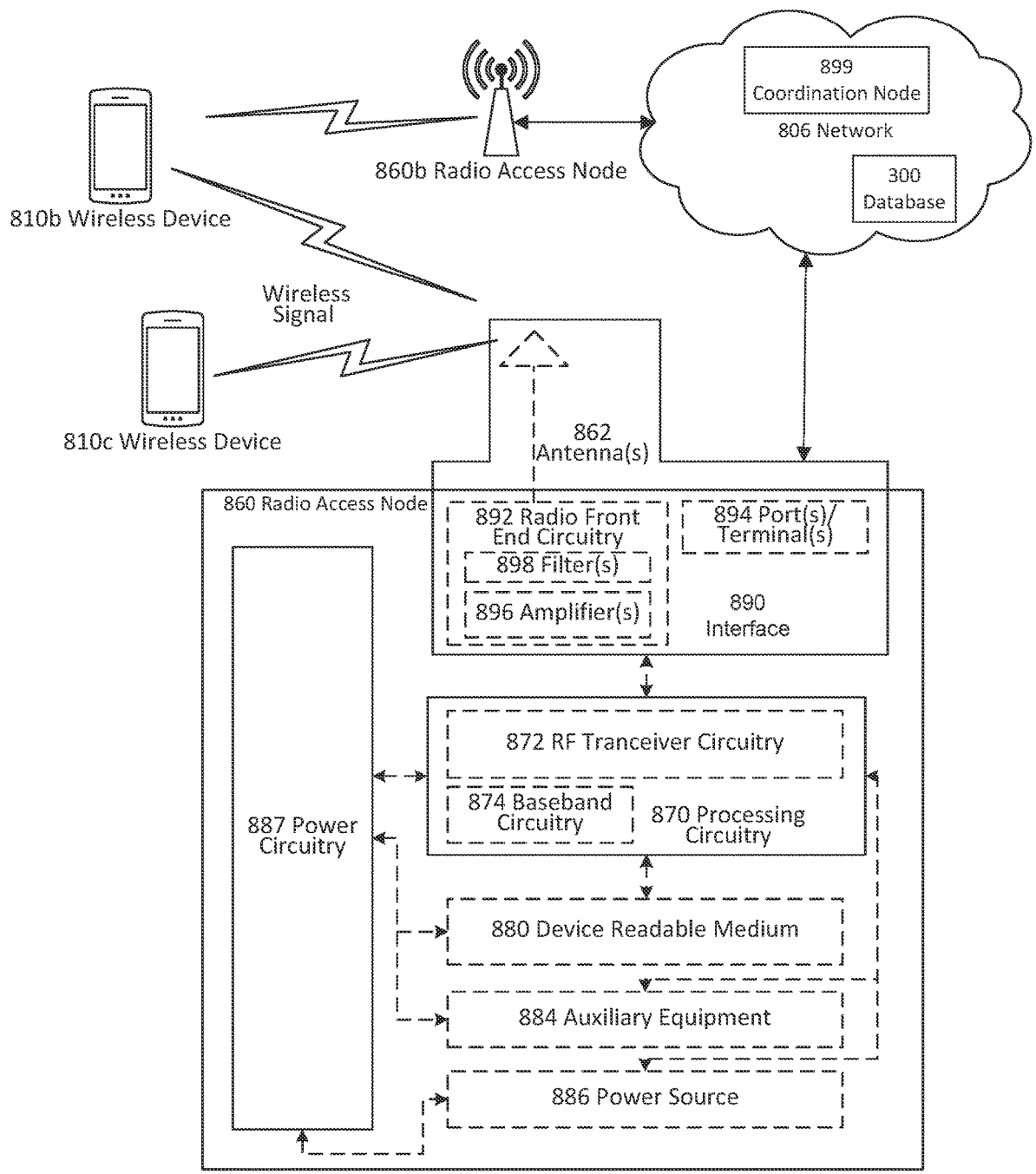
FIG. 8 is a block diagram illustrating example physical units of processing circuitry of a radio access node useful for implementing the methods described herein, according to one or more embodiments of the present disclosure.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, clustering node 899, radio access nodes 860 and 860b, and wireless devices 810b, and 810c. In practice, a wireless network may further include any additional elements suitable to support communication between wireless devices or between a wireless device and another communication device, such as a landline telephone, a service provider, or any other network node or end device. Of the illustrated components, radio access node 860 is depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G (NR) standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Radio access node 860 comprises various components described in more detail below. These components work together in order to provide radio access functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

In FIG. 8, radio access node 860 includes processing circuitry 870, device readable medium 880, interface 890, auxiliary equipment 884, power source 886, power circuitry 887, and antenna 862. Although radio access node 860 illustrated in the example wireless network of FIG. 8 may represent a device that includes the illustrated combination of hardware components, other embodiments may comprise radio access nodes with different combinations of components. It is to be understood that a radio access node comprises any suitable combination of hardware and/or software needed to perform the tasks, features, functions and methods disclosed herein. Moreover, while the components of radio access node 860 are depicted as single boxes located within a larger box, or nested within multiple boxes, in practice, a radio access node may comprise multiple different physical components that make up a single illustrated component (e.g., device readable medium 880 may comprise multiple separate hard drives as well as multiple RAM modules). Similarly, radio access node 860 may be composed of multiple physically separate components (e.g., a NodeB/gNB component and a RNC component, or a BTS component and a BSC component, etc.), which may each have their own respective components. In certain scenarios in which radio access node 860 comprises multiple separate components (e.g., BTS and BSC components), one or more of the separate components may be shared among several radio access nodes. For example, a single RNC may control multiple NodeB's. In such a scenario, each unique NodeB and RNC pair, may in some instances be considered a single separate radio access node. In some embodiments, radio access node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into radio access node 860, such as, for example, GSM, WCDMA, LTE, NR, WiFi, or Bluetooth wireless technologies. These wireless technologies may be integrated into the same or different chip or set of chips and other components within radio access node 860. Processing circuitry 870 is configured to perform any determining, calculating, or similar operations (e.g., certain obtaining operations) described herein as being provided by a radio access node. These operations performed by processing circuitry 870 may include processing information obtained by processing circuitry 870 by, for example, converting the obtained information into other information, comparing the obtained information or converted information to information stored in the radio access node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other radio access node 860 components, such as device readable medium 880, radio access node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC). In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a radio access node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of radio access node 860, but are enjoyed by radio access node 860 as a whole, and/or by end users and the wireless network generally. Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by radio access node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between radio access node 860, network 806, and/or wireless devices 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other radio access nodes or wireless devices via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, radio access node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from radio access node 860 and may be connectable to radio access node 860 through an interface or port.

Antenna 862, interface 890, and/or processing circuitry 870 may be configured to perform any receiving operations and/or certain obtaining operations described herein as being performed by a radio access node. Any information, data and/or signals may be received from a wireless device, another radio access node and/or any other network equipment. Similarly, antenna 862, interface 890, and/or processing circuitry 870 may be configured to perform any transmitting operations described herein as being performed by a radio access node. Any information, data and/or signals may be transmitted to a wireless device, another radio access node and/or any other network equipment.

Power circuitry 887 may comprise, or be coupled to, power management circuitry and is configured to supply the components of radio access node 860 with power for performing the functionality described herein. Power circuitry 887 may receive power from power source 886. Power source 886 and/or power circuitry 887 may be configured to provide power to the various components of radio access node 860 in a form suitable for the respective components (e.g., at a voltage and current level needed for each respective component). Power source 886 may either be included in, or external to, power circuitry 887 and/or radio access node 860. For example, radio access node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of radio access node 860 may include additional components beyond those shown in FIG. 8 that may be responsible for providing certain aspects of the radio access node's functionality, including any of the functionality described herein and/or any functionality necessary to support the subject matter described herein. For example, radio access node 860 may include user interface equipment to allow input of information into radio access node 860 and to allow output of information from radio access node 860. This may allow a user to perform diagnostic, maintenance, repair, and other administrative functions for radio access node 860.

The base station or radio access node 860 may be configured for serving a plurality of wireless devices and to perform any one of the methods described according to the method 600. In further detail, and according to certain embodiments, the base station is configured to obtain grouping information grouping one or more of the plurality of wireless devices together based at least in part on clustering information corresponding to each of the plurality of wireless devices and according to one or more clustering criterion. The base station 860 is configured to assign a pilot signal the one or more wireless devices based on the grouping information and transmit the one or more pilot signals. Pilot signal allocation/assignment may be performed by allocating pilot signals to radio resources associated with the one or more wireless devices. Pilot signal allocation to radio resources is mentioned here as a generic means of transmission (a radio resource element as an entity to carry pilot symbols). Of course, spatial beamforming provided by MIMO technology and encoding can be added to achieve e.g. better spatial separability, better orthogonality, enhanced coverage, etc. In some examples the grouping comprises each of the one or more wireless devices being within a group sharing a common clustering information and wherein each one of the one of more wireless devices in said group are assigned a different pilot signal of a plurality of pilot signals. In other examples the obtained information comprises each one of the wireless devices in a group being distinct from each other according to the one or more clustering criterion and wherein at least two of the one of more wireless devices in said group are assigned the same pilot signal. In such examples, each one of the one or more wireless devices in said group may be assigned the same pilot signal. In other examples the obtained grouping information comprises a plurality of groups according to the one or more clustering criterion and the base station 860 is configured to assign a different pilot signal to each one of the different groups.

In some examples the base station 860 is further configured to send a request for grouping information and wherein the obtained grouping information is obtained in response to said request.

In some embodiments the processing circuitry 870 is configured to received instructions stored in the device readable medium 880 which cause the processing circuitry 870, when the instructions are executed, to perform any of the embodiments described herein. More specifically, the methods as described in accordance with method 600 may be performed. The transceiver circuitry 872 is configured to send and receive radio signals between the base station 860 and the one or more wireless devices as instructed by the relevant steps performed by the processing circuitry 870. The interface circuitry 890 is configured to send and receive electronic signals between the base station and other network nodes, such as the network 806, and in some examples a clustering node 899, as instructed by the relevant steps performed by the processing circuitry 870.

Figure 9:
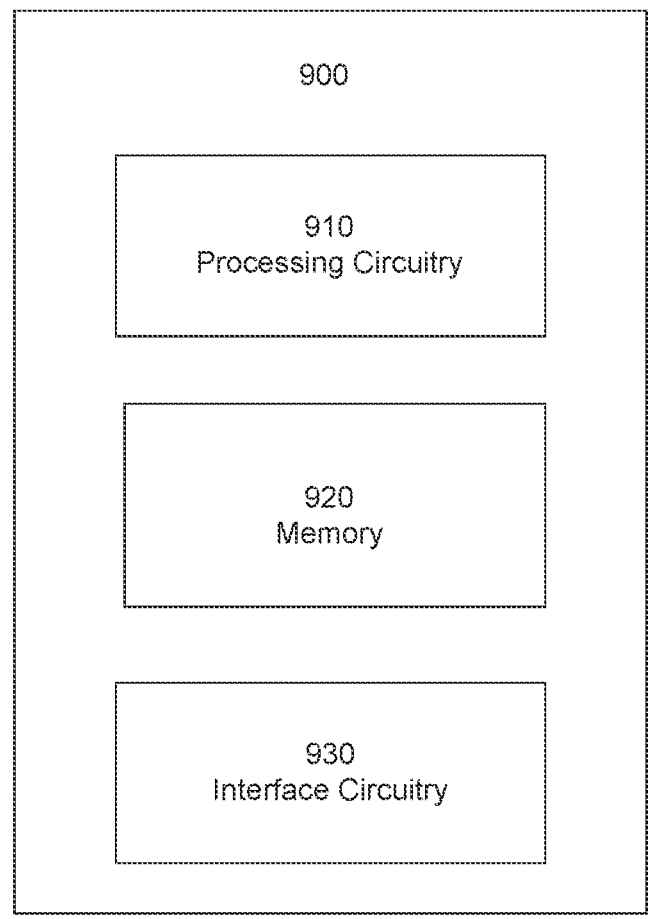
FIG. 9 is a block diagram illustrating example physical units of processing circuitry of a network node useful for implementing the methods described herein, according to one or more embodiments of the present disclosure.

FIG. 9 depicts a network node 900 according to some embodiments disclosed herein and to perform any one of the methods described according to the method 700. In further detail, and according to certain embodiments, the network node 900 is configured to obtain clustering information corresponding to one or more wireless devices and to group the one or more wireless devices into one or more groups based on the clustering information and according to the one or more clustering criterion.

In some embodiments the network node 900 is further configured to receive a request for grouping the one or more wireless devices and provide, in response to the request, grouping information grouping the one or more wireless devices. The one or more clustering criterion may comprise a spatial relationship between each of the one or more wireless devices and a base station. In some examples the clustering information comprises one or more of an angle of arrival positioning information, global positioning information, assisted global positioning information, serving cell information, beam-reports in a beam-managed system.

In some embodiments grouping the one or more wireless devices into one or more groups based on one or more clustering criterion comprises each of the one or more wireless devices being within a group sharing a common clustering criterion.

In other embodiments grouping the one or more wireless devices into one or more groups based on one or more clustering criterion comprises each one of the wireless devices in a group being distinct from each other according to the one or more clustering criterion.

In some embodiments the network node 900 is further configured to obtain further clustering information and adapt the grouping of the one or more wireless devices based on the further clustering information. In some examples of this embodiment the obtained further clustering information comprises requesting periodical updates of previously reported clustering information. In other examples the further clustering information comprises a delta from a previously reported clustering information. In some examples of this embodiment the adapted grouping of the one or more wireless devices comprises removing one or more wireless devices from a first group and adding the one or more wireless devices to a second group.

In some embodiments the network node 900 comprises a cloud server.

The network node 900 may be configured to obtain the clustering information from a remote database. In other embodiments the network node 900 may comprise a database, for example within memory 920.

In some embodiments the network node 900 is further configured to assign pilot signals to the wireless devices based on the grouping information and provide said pilot signal assignment to a second network node.

In some embodiments the network node 900 comprises processor circuitry 910, memory 920, and interface circuitry 930. The processor circuitry 910 is configured to received instructions stored in the memory 920 which cause the processor circuitry 910, when the instructions are executed, to perform any of the embodiments described herein. More specifically, the methods as described in accordance with method 700 may be performed.

The interface circuitry 930 is configured to send and receive electronic signals between the network node 900 and other network nodes, such as a base station, as instructed by the relevant steps performed by the processing circuitry 910.

Figure 10:
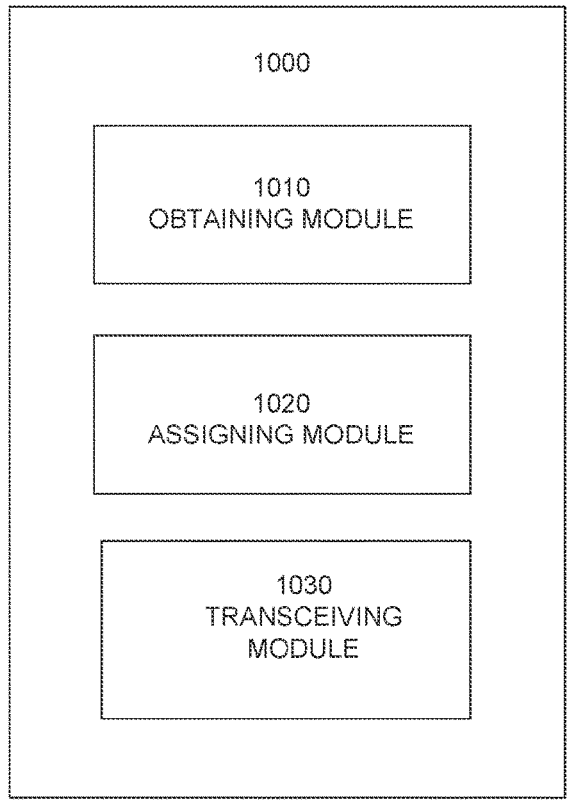
FIG. 10 is a block diagram illustrating example software modules of a radio access node control application useful for implementing the methods described herein, according to one or more embodiments of the present disclosure.
Figure 11:
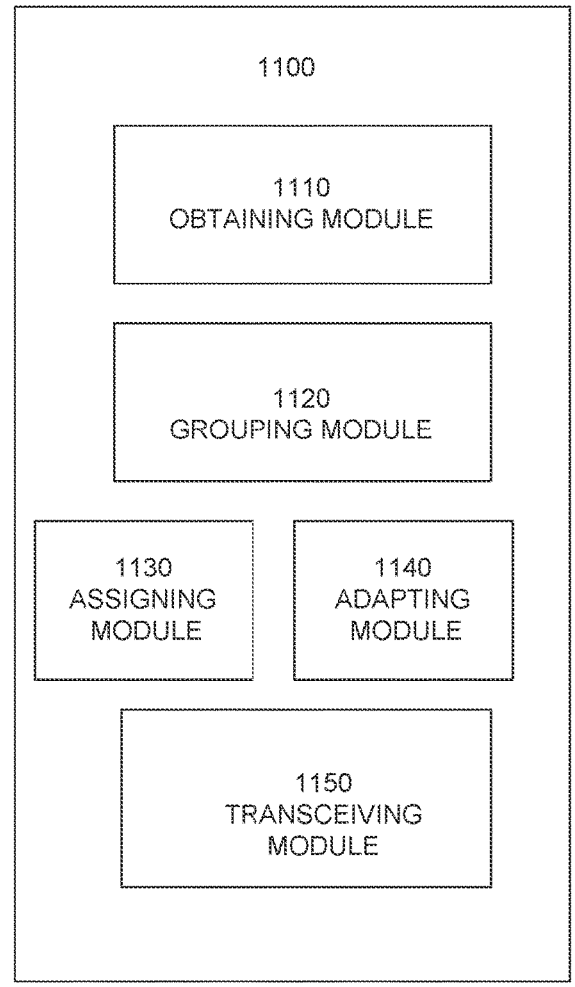
FIG. 11 is a block diagram illustrating example software modules of a network node control application useful for implementing the methods described herein, according to one or more embodiments of the present disclosure.

FIGS. 10 and 11 illustrate functional units in other embodiments of a radio access node, e.g. a base station, 1000 and a network node, e.g. a clustering node 1100, which may execute the methods described herein, for example according to computer readable instructions received from a computer program. It will be understood that the modules illustrated in FIGS. 10 and 11 may be software implemented functional units, and may be realised in any appropriate combination of software modules.

FIG. 10 provides an example radio access node 1000 wherein the radio access node comprises an obtaining module 1010 for obtaining grouping information which groups one or more of the plurality of wireless devices together based at least in part on clustering information corresponding to each of the plurality of wireless devices and according to one or more clustering criterion as described above. The radio access node 1000 comprises an assigning module 1020 for assigning at least one pilot signal to the one or more wireless devices based on the grouping information. Pilot signal assignment may be performed by allocating pilot signals to radio resources associated with the one or more wireless devices. Pilot signal allocation/assignment to radio resources is mentioned here as a generic means of transmission (a radio resource element as an entity to carry pilot symbols). Of course, spatial beamforming provided by MIMO technology and encoding can be added to achieve e.g. better spatial separability, better orthogonality, enhanced coverage, etc. The radio access node 1000 includes a transceiving module 1030 for transmitting the at least one pilot signals. The pilot signals may be transmitted in a broadcast or broad beam signalling. In other examples the pilot signals may be beamformed to a narrow beam. In some examples the choice of beam forming may depend on the clustering criterion. Optionally, the transceiver module 1030 includes sending a request for grouping information to another node, for example a coordination node, which may be termed a clustering node. The obtaining module 1010 may thus be configured to obtain the information in response to said request. In some examples the request includes an indication corresponding to the clustering criteria. The clustering criteria may include information regarding the type of spatial information the base station wishes the clustering node to take into account when grouping the wireless devices into clusters. The information may also indicate the type of clustering, e.g. spatially similar or spatially distinct/different. In other examples such clustering type may be implied/determined by the clustering node based on other clustering criteria such as cell load, other cell performance characteristics.

FIG. 11 provides an example coordination node 1100 which comprises an obtaining module 1110 for obtaining clustering information corresponding to one or more wireless devices. The network node may obtain the clustering information by receiving, for example, spatial information and incorporating a database or repository from which it can determine the clustering information. In other examples obtaining clustering information comprises obtaining the information from a remote database. The clustering information may comprise a spatial signature, for example. In some examples the clustering information comprises any one or more of: an angle of arrival positioning information, global positioning information, assisted global positioning information, serving cell information, beam-reports in a beam-managed system. The coordination node 1100 includes a grouping module 1120 for grouping the one or more wireless devices into one or more groups based on the clustering information and according to the one or more clustering criterion. The one or more clustering criterion may comprise a spatial relationship between each of the one or more wireless devices and a base station. In some examples the spatial relationship is a relative direction between each of the one or more wireless devices and the base station, for example angle of arrival, AOA, information. The coordination node 1100 optionally includes a transceiving module 1150 for receiving a request for grouping one or more wireless devices and providing the grouping information grouping the wireless devices to another network node. In other examples the grouping information may be periodically performed and the transceiving module 1150 is configured to provide the grouping information periodically to a base station for example. The obtaining module 1110 may optionally be further configured to obtain further clustering information, for example as a result of a periodical training phase. The transceiving module 1150 may then be further configured for requesting periodical updates of previously reported clustering information or alternatively the transceiving module may be configured to receive periodical updates without an explicit request. The further clustering information may in some examples comprise a delta from a previously reported clustering information. The coordination node 1100 optionally includes an adapting module 1140 for adapting the grouping of the one or more wireless devices based on the further clustering information. In some examples adapting the grouping of the one of more wireless devices comprises removing one or more wireless devices from a first group and adding the one or more wireless devices to a second group.

The coordination node 1100 optionally includes an assigning module 1130 for assigning pilot signals to the wireless devices based on the grouping information. Pilot signal assignment may be performed by allocating pilot signals to radio resources associated with the one or more wireless devices. Pilot signal allocation/assignment to radio resources is mentioned here as a generic means of transmission (a radio resource element as an entity to carry pilot symbols). Of course, spatial beamforming provided by MIMO technology and encoding can be added to achieve e.g. better spatial separability, better orthogonality, enhanced coverage, etc. This may for example be a separate service request by a base station or may comprise the normal function of the network node to perform the pilot signal assignment/allocation for a plurality of base stations/cells. The transceiving module 1150 is then further configured for providing said pilot signal allocation to a second network node, for example a base station.

Figure 12:
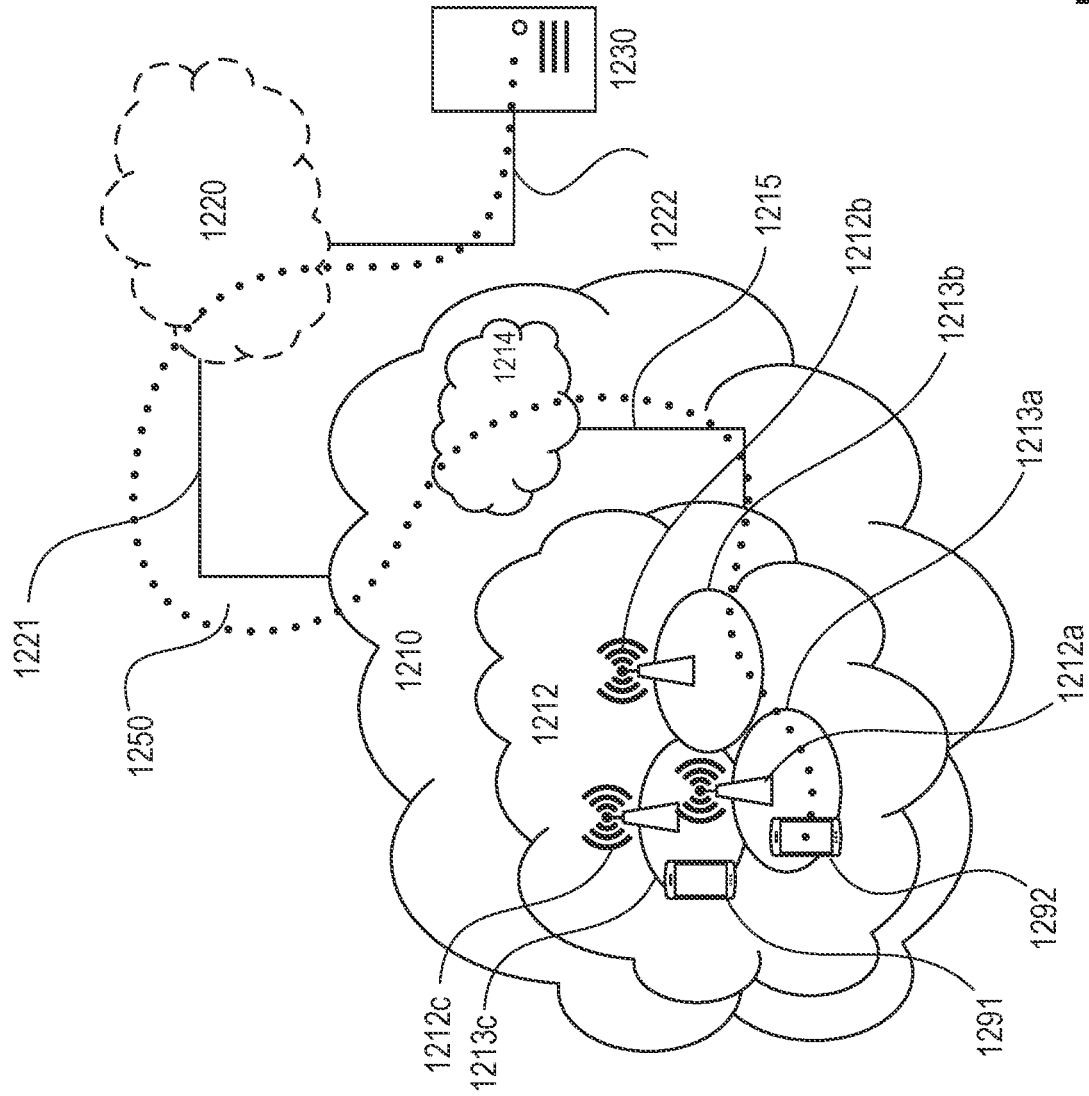
FIG. 12 shows a telecommunication network connected via an intermediate network to a host computer in accordance with some embodiments of the disclosure.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1230, one of base stations 1112a, 1112b, 1112c and one of UEs 1191, 1192 of FIG. 11, respectively. This is to say, the inner workings of these entities may be as shown in FIG. 11 and independently, the surrounding network topology may be that of FIG. 11.

Figure 13:
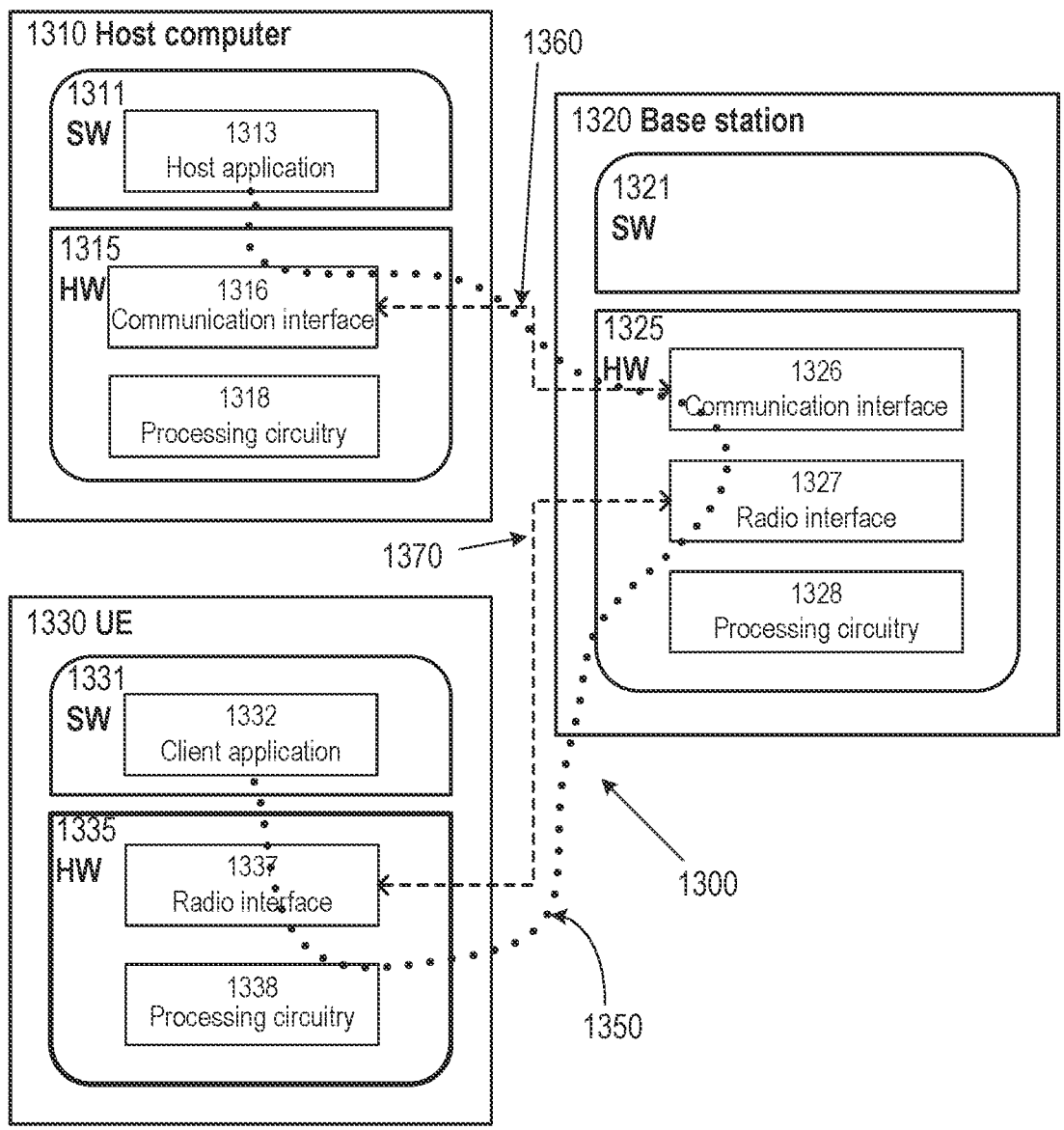
FIG. 13 shows a host computer communicating via a base station with a user equipment over a partially wireless connection in accordance with some embodiments of the disclosure.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may provide increased throughput through reduced interference and improved channel estimation, and hence improved overall network performance and thereby provide benefits such as faster response of applications, e.g., remote applications such as vehicle control/remote driving and high definition services.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
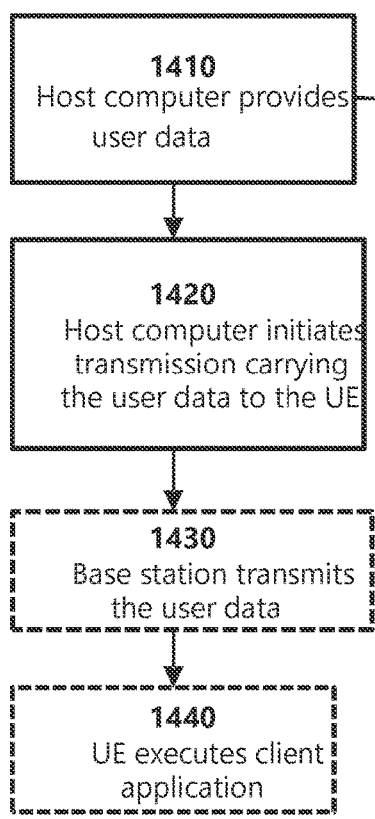
FIGS. 14 and 15 show methods implemented in a communication system including a host computer, a base station and a user equipment in accordance with some embodiments of the disclosure and, FIGS. 16 and 17 show methods implemented in a communication system including a host computer, a base station and a user equipment in accordance with some embodiments of the disclosure.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
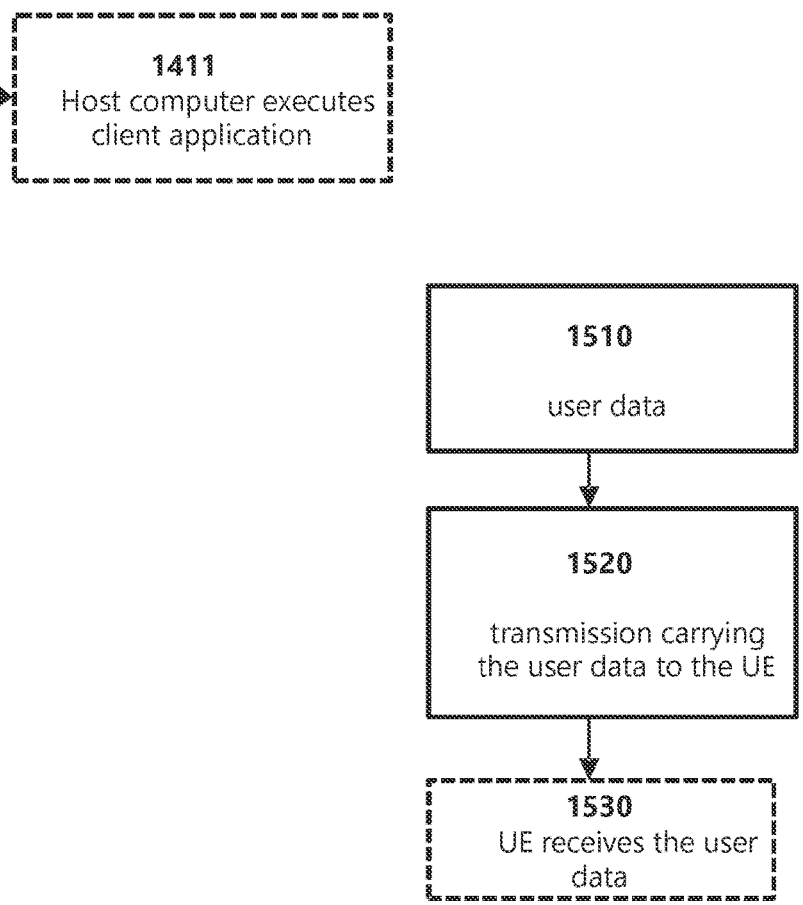

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figures 16, 17:
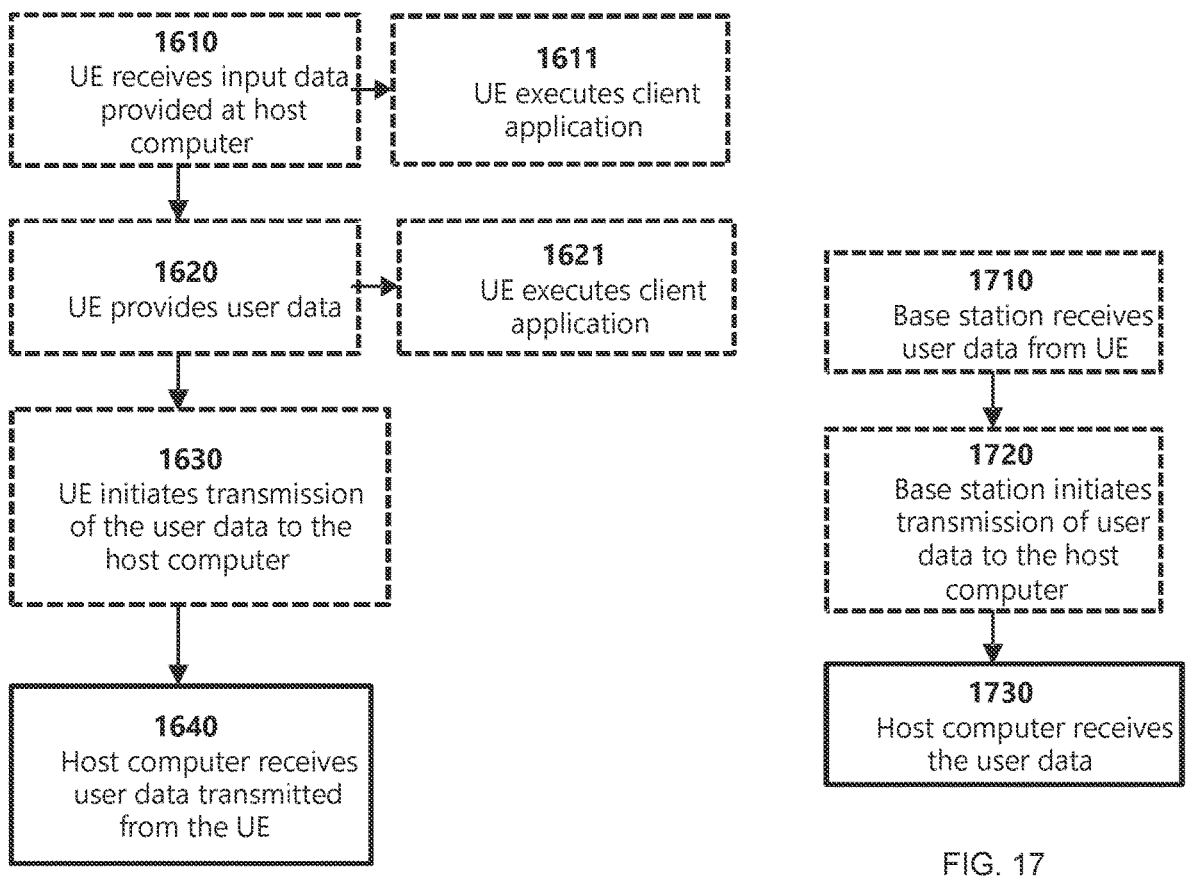

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method performed by a base station serving a plurality of wireless devices, the method comprising: sending a request for grouping information indicating one or more clustering criterion and receiving the grouping information in response to the request; grouping one or more of the plurality of wireless devices together based at least in part on clustering information corresponding to each of the plurality of wireless devices and according to the one or more clustering criterion, wherein the grouping information comprises each one of the wireless devices in a group being distinct from each other according to the associated clustering information and the one or more clustering criterion, and wherein the one or more clustering criterion comprises a spatial relationship between each of the one or more wireless devices and the base station; assigning at least one pilot signal to the one or more wireless devices based on the grouping information, wherein at least two of the one of more wireless devices in said group are assigned the same pilot signal; and transmitting the at least one pilot signal.

2. The method according to claim 1 wherein the pilot signal is orthogonal or semi-orthogonal within a group of wireless devices.

3. The method according to claim 1, wherein the clustering information and the one or more clustering criterion is based at least in part on a measured property of the one or more of the plurality of wireless devices.

4. The method according to claim 1, wherein each one of the one or more wireless devices in said group are assigned the same pilot signal.

5. The method according to claim 4, wherein the obtained grouping information comprises a plurality of groups according to the one or more clustering criterion and the assigning at least one pilot signal to the one or more wireless devices comprises assigning a different pilot signal to each one of the different groups.

6. The method according to claim 1, wherein the spatial relationship is a relative direction between each of the one or more wireless devices and the base station.

7. A method performed by a system for providing pilot signals to a plurality of wireless devices, the method comprising: receiving a request for grouping information indicating one or more clustering criterion and sending the grouping information in response to the request; obtaining clustering information corresponding to one or more wireless devices, wherein the one or more clustering information comprises a spatial relationship between each of the one or more wireless devices and a serving base station; grouping the one or more wireless devices into one or more groups based on the clustering information and according to the one or more clustering criterion, wherein the grouping comprises each one of the wireless devices in a group being distinct from each other according to the one or more clustering criterion; and providing the grouping information to the serving base station, wherein the grouping information corresponds to the grouping of the one or more wireless devices; assigning, at least one pilot signal to the one or more wireless devices based on the grouping information, wherein at least two of the one of more wireless devices in said group are assigned the same pilot signal; and transmitting the at least one pilot signal.

8. The method according to claim 7, wherein the spatial relationship is a relative direction between each of the one or more wireless devices and the base station.

9. The method according to claim 7, wherein the clustering information comprises a spatial signature.

10. The method according to claim 7, wherein the clustering information comprises any of:
    angle of arrival positioning information;
    global positioning information;
    assisted global positioning information;
    serving cell information; and
    beam-reports in a beam-managed system.

11. The method according to claim 7, further comprising:
    obtaining further clustering information; and
    adapting the grouping of the one or more wireless devices based on the further clustering information.

12. The method according to claim 11, wherein the obtaining further clustering information comprises requesting periodical updates of previously reported clustering information.

13. The method according to claim 11, wherein the further clustering information comprises a delta from a previously reported clustering information.

14. The method according to claim 11, wherein adapting the grouping of the one of more wireless devices comprises removing one or more wireless devices from a first group and adding the one or more wireless devices to a second group.

15. The method according to claim 7, wherein obtaining clustering information comprises obtaining the information from a remote database.

16. The method according to claim 7, wherein the grouping information comprises the pilot signal assignment.

17. A base station configured for serving a plurality of wireless devices, the base station configured to: send a request for grouping information indicating one or more clustering criterion and receiving the grouping information in response to the request; group one or more of the plurality of wireless devices together based at least in part on clustering information corresponding to each of the plurality of wireless devices and according to the one or more the clustering criterion, wherein the grouping information comprises spatial information of each one of the wireless devices in a group being distinct from each other according to the one or more clustering criterion, and wherein the one or more clustering criterion comprises a spatial relationship between each of the one or more wireless devices and the base station; assign at least one pilot signal to the one or more wireless devices based on the grouping information, wherein at least two of the one of more wireless devices in said group are assigned the same pilot signal; and transmit the at least one pilot signal.

18. The base station according to claim 17, wherein each one of the one or more wireless devices in said group are assigned the same pilot signal.

* * * * *